US007351480B2

(12) United States Patent
Wei et al.

(10) Patent No.: US 7,351,480 B2
(45) Date of Patent: Apr. 1, 2008

(54) TUBULAR STRUCTURES WITH COATED INTERIOR SURFACES

(75) Inventors: Ronghua Wei, San Antonio, TX (US); Chistopher Rincon, San Antonio, TX (US); James Arps, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 525 days.

(21) Appl. No.: 10/693,076

(22) Filed: Oct. 24, 2003

(65) Prior Publication Data

US 2004/0115377 A1 Jun. 17, 2004

Related U.S. Application Data

(63) Continuation-in-part of application No. 10/167,189, filed on Jun. 11, 2002, now Pat. No. 6,764,714.

(51) Int. Cl.
*B32B 1/08* (2006.01)
*B32B 15/02* (2006.01)
*B32B 15/04* (2006.01)
*B32B 33/00* (2006.01)

(52) U.S. Cl. .................... 428/634; 428/34.1; 428/156; 428/215; 428/220; 428/332; 428/336; 428/408; 428/409; 428/641

(58) Field of Classification Search ................ 428/627, 428/634, 34.1, 156, 220, 332, 408, 409, 457, 428/698, 586, 215, 336, 446, 450, 469, 641
See application file for complete search history.

(56) References Cited

U.S. PATENT DOCUMENTS 3,952,334 A 4/1976 Bokros
4,009,090 A 2/1977 Veigel
4,169,477 A * 10/1979 Bokros ...................... 604/175
4,179,351 A 12/1979 Hawton
4,221,652 A 9/1980 Kuriyama
RE30,635 E 6/1981 Kuppers
4,300,244 A * 11/1981 Bokros ...................... 623/1.13
4,376,025 A 3/1983 Zega
4,407,713 A 10/1983 Zega
4,444,643 A 4/1984 Garrett
4,478,703 A 10/1984 Edamura
4,818,359 A 4/1989 Jones et al.
4,842,704 A 6/1989 Collins et al.

(Continued)

FOREIGN PATENT DOCUMENTS

GB 2-125-441 A 7/1983

(Continued)

OTHER PUBLICATIONS

Kopidakis et al., "Hydrogen-induced structural changes . . . ," Phys. Rev. B, vol. 58, No. 21, Dec. 1998, pp. 14 106 through 14 109.*

(Continued)

*Primary Examiner*—Michael E. Lavilla
(74) *Attorney, Agent, or Firm*—The Morris Law Firm P.C.

(57) ABSTRACT

Tubular structures having aspect ratios of at least about 3 and comprising interior surfaces comprising substantially uniform coatings generated from a gaseous precursor material.

27 Claims, 1 Drawing Sheet

U.S. PATENT DOCUMENTS

| | | | | |
|---|---|---|---|---|
| 4,960,753 | A | 10/1990 | Collins et al. | |
| 5,015,493 | A | 5/1991 | Gruen | |
| 5,026,466 | A | 6/1991 | Wesemeyer | |
| 5,096,562 | A | 3/1992 | Boozenny | |
| 5,272,735 | A | 12/1993 | Bryan | |
| 5,387,447 | A * | 2/1995 | Slutz et al. | 428/34.1 |
| 5,478,608 | A | 12/1995 | Gorokhovsky | |
| 5,681,623 | A | 10/1997 | Ferralli | |
| 5,935,391 | A | 8/1999 | Nakahigashi et al. | |
| 5,941,647 | A * | 8/1999 | Koike et al. | 384/296 |
| 6,193,853 | B1 | 2/2001 | Yumshtyk | |
| 6,338,777 | B1 | 1/2002 | White | |
| 6,764,714 | B2 | 7/2004 | Wei | |
| 6,767,436 | B2 | 7/2004 | Wei | |
| 7,052,736 | B2 | 5/2006 | Wei | |
| 2003/0157345 | A1 * | 8/2003 | Beldi et al. | 428/447 |
| 2003/0228466 | A1 | 12/2003 | Wei | |
| 2004/0115377 | A1 | 6/2004 | Wei | |
| 2006/0076231 | A1 | 4/2006 | Wei | |
| 2006/0076235 | A1 | 4/2006 | Wei | |

FOREIGN PATENT DOCUMENTS

| | | |
|---|---|---|
| JP | 59-215484 | 12/1984 |

OTHER PUBLICATIONS

Hosokawa, et al., Self-Sputtering Phenomena in High-Rate Coaxial Cytindrical Magnetron Sputtering, J. Vac. Sci. Technolo., Jan./Feb. 1977, pp. 143-146, vol. 14 No. 1.

USPTO, First Office Action for U.S. Appl. No. 10/167,189, Jul. 16, 2003.

The Morris Law Firm, P.C. Response to First Office Action for U.S. Appl. No. 10/167,189, Sep. 29, 2003.

USPTO, First Office Action for U.S. Appl. No. 10/807,039, Sep. 26, 2005.

The Morris Law Firms, P.C., Response to First Office Action for U.S. Appl. No. 10/807,039, Dec. 21, 2005.

Hosokawa, et al., Self-Sputtering Phenomena in High-Rate Coaxial Cylindrical Magnetron Sputtering, J. Vac. Sci, Technol. vol. 14 No. 1, Jan./Feb. 1977, pp. 143-146.

PCT, International Search Report for PCT/US2005/24110 of Jan. 31, 2006.

PCT, Written Opinion for PCT/US2005/24110 of Jan. 31, 2006.

PCT, International Preliminary Report on Patentability for PCT/US2005024110 Apr. 26, 2007.

Malik et. al. Development of an energetic ion assisted mixing and deposition process for TiNx and diamondlike carbon films, using a co-axial geometry in plasma source ion implantation; J. Vac. Sci. Technol, Nov/Dec 1997, 2875-2879, A15, American Vacuum Society.

Ensinger, An Apparatus for sputter coating the inner walls of tubes, Rev. Sci. Instrum, Jan. 1996, 318-321, 67(1), American Institute of Physics.

USPTO, First Office Action for U.S. Appl. No. 10/963,341, Jul. 21, 2006.

The Morris Law Firm, P.C. Response to First Office Action for U.S. Appl. No. 10/963,341, Sep. 15, 2006.

USPTO, Second Office Action for U.S. Appl. No. 10/963,341, Nov. 20, 2006.

The Morris Law Firm, P.C. Response to Second Office Action for U.S. Appl. No. 10/963,341, Jan. 19, 2007.

English Translation of Japanese Publication No. JP 4-107268 also referred to as Japanese Patent Application No. H02-224696, Published Apr. 8, 1992, Entitled "Processing Device of Mixed Gas," Inventor: Naoyoshi Fujiwara, Application: TOSHIBAB Corporation, pp. 381-385.

USPTO, First Office Action after RCE for U.S. Appl. No. 10/963,341, Feb. 15, 2007.

The Morris Law Firm, P.C. Response to First Office Action after RCE for U.S. Appl. No. 10/963,341, Apr. 18, 2007.

USPTO, Second Office Action after RCE for U.S. Appl. No. 10/963,341, Jul. 6, 2007.

The Morris Law Firm, P.C. Article 19 Amendments for PCT/US2005/24110, Mar. 24, 2006.

WIPO, WO 2006/044002 A2 International Application for PCT/US No. 2005/024110, Apr. 27, 2006.

PCT, International Search Report for PCT/US05/24119, Jul. 11, 2006.

PCT, Written Opinion for PCT/US05/24119, Jul. 11, 2006.

PCT, International Preliminary Report on Patentability for Application PCT/US05/24119, Apr. 26, 2007.

* cited by examiner

TUBULAR STRUCTURES WITH COATED INTERIOR SURFACES

CROSS-REFERENCE TO RELATED APPLICATIONS

This application is a continuation-in-part application of U.S. patent application Ser. No. 10/167,189, filed on Jun. 11, 2002 now U.S. Pat. No. 6,764,714.

FIELD OF THE INVENTION

The invention relates to tubular structures with coated interior surfaces.

BACKGROUND OF THE INVENTION

Deposition of coatings onto the interior surface of tubular structures is needed for various applications, including, but not necessarily limited to gun barrels, automotive cylinder bores, and tubes for special applications.

Tubes with relatively large diameters have been successfully coated using known methods. However, as the diameter of the tube becomes smaller and smaller, it becomes more and more difficult to deposit a substantially uniform coating over the entire interior surface. Most methods simply do not succeed if the aspect ratio (length-to-diameter ratio) of the tube is high.

Effective and economical methods are needed to form substantially uniform coatings on interior surfaces of tubes with a high aspect ratio.

SUMMARY OF THE INVENTION

The invention provides a tubular structure having an aspect ratio of at least about 3 and comprises an interior surface, said interior surface comprising a substantially uniform coating generated from a gaseous precursor material. In a preferred embodiment, the interior surface comprises a substantially uniform amorphous carbon coating. In another preferred embodiment, the tubular structure has an aspect ratio of about 6 or more.

DETAILED DESCRIPTION OF THE INVENTION

The invention provides a method for coating the interior surface of a tubular structure, preferably a tubular structure having a "high aspect ratio." A "high aspect ratio" is defined herein as an aspect ratio that is sufficiently high that previous techniques for depositing coatings from gaseous precursor materials have been unable to produce a substantially uniform coating on the interior surface of the tubular structure. Typically, a high aspect ratio is a ratio of length:diameter of about 3 or more, preferably about 6 or more.

According to the present application, a substantially uniform coating is formed on the interior surface of tubular structures. As used herein, a "substantially uniform coating" refers to the interior surface being completely covered by a coating having a desired thickness, preferably, a coating having a uniformity of thickness of about +/−20% or less of the desired coating thickness along its length. Glow discharge deposition is used to form the substantially uniform coating on the interior surface of the tubular structures. Specifically, a magnetic field enhanced plasma deposition technique known as plasma enhanced chemical vapor deposition (PECVD) is used in forming coatings of the present application. The invention is not limited to coating the interior surface of tubular structures with a high aspect ratio; however, a preferred embodiment is to coat the interior surface of a tubular structure having a high aspect ratio.

The tubular structure made using the present invention may be comprised of substantially any material. The procedure takes place at relatively low temperatures, so thermal sensitivity is not an issue. Hence, the procedure is useful to coat materials that withstand high temperatures, such as ceramics, stainless steel, and other metal alloys, and to coat thermally sensitive materials, such as plain carbon steels and polymers. Depending on the applied voltage and pulse frequency, coatings may be formed at temperatures as low as about 100° C., or as high as about 500° C.

The invention will be described further with reference to the exemplary setup 10 in FIG. 1. Persons of ordinary skill in the art will understand that many variations may be made to this setup while still remaining within the spirit and scope of the invention.

Figure 1A:
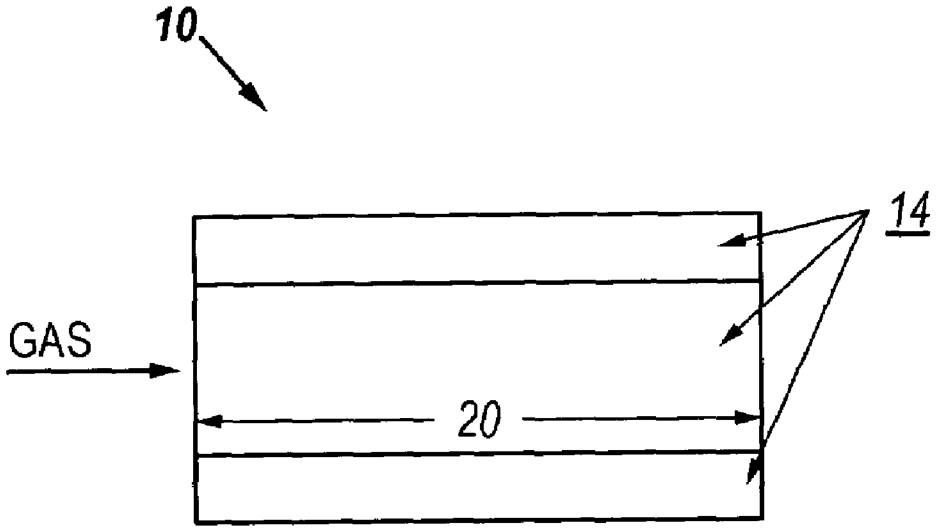
FIG. 1 is a schematic of a setup used to coat a high aspect ratio tube according to the present invention.
Figure 1B:
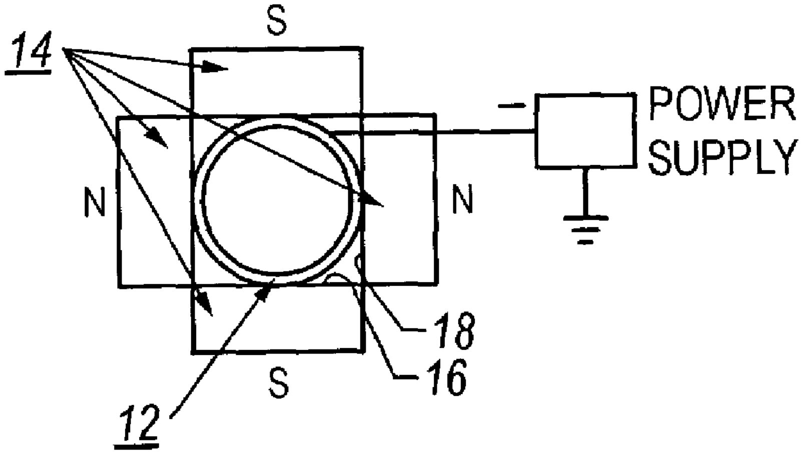

Referring to FIG. 1, a tube 12 is placed in the center of a magnetic field of at least about 1000, preferably about 3000 Gauss. In the embodiment shown in FIG. 1, the magnetic field is derived from four elongated rectangular magnets 14 spaced around the circumference of the tube (1*b*) and along the full length 20 of the tube (1*a*). The magnets 14 are positioned around the tube so that the magnetic flux coming out from the interior surface 16 of a magnet will go into the interior surface 18 of the adjacent magnet to form a complete loop. As a result, the tube 12 is exposed to four quadrants of magnetic fluxes wherein the magnetic field lines are perpendicular to and penetrate through the tube wall. To increase the circumferential uniformity, a motor can be used to rotate either the magnets or the tube. Persons of ordinary skill in the art will recognize that the magnetic field may be derived from any number of magnets capable of being spaced around the circumference of a tube, and thus, the tube may be exposed to any number of quadrants of magnetic fluxes. Persons of ordinary skill in the art will also recognize that other arrangements of magnets, such as a cylindrical magnet that completely surrounds the tube, also would produce a magnetic field that forms a complete loop. Such equivalent arrangements are encompassed by the present invention.

The entire setup 10 is placed in a vacuum chamber (not shown). Preferably, the interior surface of the tubular structure is first cleaned to remove superficial contaminants. An inert gas, such as argon gas, is backfilled into the chamber to a pressure of about 0.5 to about 100 millitorr, preferably about 15 millitorr. A pulse frequency of from about 1 Hz to about 20 kHz, preferably from about 2 kHz to about 3 kHz, at a pulse width of from about 5 microseconds to about 40 microseconds, preferably about 20 microseconds, is applied to bias the tube to at least about 200V, preferably about 4 kV, for a duration necessary to deposit a coating having the desired thickness. Preferably, from about 5 minutes to about 60 minutes, most preferably for about 30 minutes.

At least for some inorganic substrates, preferably metal alloys, it may be necessary to treat the substrate with an intermediate material in order to form a bonding gradient between the substrate and the carbon in the carbonaceous precursor material. An example of how a metal alloy substrate may be treated to form a bonding gradient includes, but is not necessarily limited to the method described in U.S. Pat. Nos. 5,593,719; 5,605,714; 5,780,119; 5,725,573; 6,087,025; and 6,171,343, incorporated herein by reference. Applying the teachings of these patents to form the present coating on a metal alloy substrate, an interlayer of silicon, is formed in a manner effective to form covalent metal-silicide bonds, and to leave an outer film of silicon. The silicon forms covalent bonds with carbon in the carbonaceous precursor material using the present method. In another embodiment, an interlayer of germanium is formed in a manner effective to form covalent metal-germanide bonds.

In order to form such a bonding gradient, or to form a silicon coating, the gaseous bonding precursor is introduced after the inert gas. In the case of a metal alloy substrate, the gaseous bonding precursor comprises silicon. Suitable silicon-containing gaseous bonding precursors include, but are not necessarily limited to silanes, trimethyl silanes, and the like. In order to introduce the gaseous bonding precursor into the vacuum chamber, the flow of the inert gas is simply halted. The gaseous bonding precursor is introduced at a rate of from about 0 to about 200 standard cubic centimeters per minute (SCCM's), depending upon the pumping speed, and to obtain a pressure of from about 0.5 to about 100 millitorr, preferably from about 10 to about 20 millitorr. A pulse frequency of from about 1 Hz to about 20 kHz, preferably from about 2 kHz to about 3 kHz, at a pulse width of about 5 microseconds to about 40 microseconds, preferably about 20 microseconds, is applied to bias the tube to about 200V, preferably about 4 kV, for a duration necessary to deposit a coating having the desired thickness. Preferably, from about 5 minutes to about 60 minutes, most preferably for about 30 minutes.

The flow of the gaseous bonding precursor is then halted. If a silicon coating is desired, the procedure is complete. If an additional surface coating of amorphous carbon (or another material) is desired, the chamber is back-filled with a selected gaseous precursor material for the surface coating. A most preferred gaseous precursor material is a carbonaceous gaseous precursor, which is backfilled into the vacuum chamber at a rate of from about 1 SCCM to about 200 SCCM, preferably about 40 SCCM, depending upon the flow rate, and to a pressure of from about 0.5 to about 100 millitorr, preferably to about 15 millitorr. A pulse frequency of from about 1 Hz to about 20 kHz, preferably from about 2 kHz to about 3 kHz, at a pulse width of from about 5 microseconds to about 40 microseconds, preferably about 20 microseconds, is applied to bias the tube at about 200V or more, preferably about 4 kV for from about 5 minutes to about 8 hours, preferably for about 3 hours, or until a coating having a desired thickness is produced. A desired thickness for an amorphous carbon coating is at least about 0.5 micrometers, preferably about 2 micrometers or more, more preferably about 5 micrometers or more, and even more preferably about 15 micrometers or more, depending upon the application. The substrate temperature during deposition is sufficiently low to avoid damaging the substrate and to allow the coating to collect on the substrate. In addition, the coating thickness may increase near the exit point of the tubular structure due to gas pressure plasma density changes near the exit point. In order to avoid an increased coating thickness near the exit point section of the tubular structure, (1) the exit point section may be cut off, or (2) an extension tube, having the same diameter as the tubular structure, may be added to the end of the tubular structure during the coating process.

In each instance, a glow discharge is generated by the gaseous precursor material. Since the magnetic field is very strong inside the tube, electrons generated by the glow discharge experience many collisions before escaping from the tube. Due to their collision with molecules of the gaseous precursor material, a high flux of ionic gaseous precursor material is produced. Since the tube is biased negatively, these ions are drawn to the interior surface of the tube and impinge on the interior surface. The result is a substantially uniform coating, depending upon the gaseous precursor material used.

Substantially any coating that can be made using a gaseous precursor material may be made using the present invention. Preferred coatings include amorphous carbon coatings, metallic coatings, silicon coatings, and ceramic coatings, including but not necessarily limited to oxides, carbides, and nitrides. Most preferred coatings are amorphous carbon coatings, ceramic coatings, metallic coatings, and silicon coatings. If a hydrocarbon gas is used, such as $CH_4$ or $C_2H_2$, an amorphous carbon film forms. If an organometallic gas is used (such as Cr-, Al-, Ti-containing precursors), a metallic or ceramic coating is deposited.

As used herein, the term "amorphous carbon" refers to a carbonaceous coating composed of a mixture of $Sp^2$ and Sp hybridized carbon. $Sp^2$ carbon refers to double bonded carbon commonly associated with graphite. $Sp^3$ hybridized carbon refers to single bonded carbon. Amorphous carbon does not possess a highly ordered crystalline structure, but generally takes the form of small nanometer sized (or larger) islands of graphite dispersed within an amorphous matrix of $sp^3$ bonded carbon. Amorphous carbon made by the present glow discharge method may be essentially 100% carbon or may have a sizeable amount (up to 50 atomic %) of C—H bonded hydrogen. Amorphous carbon does not usually exist in bulk form, but is deposited as a coating or film by such methods as ion beam assisted deposition, direct ion beam deposition, magnetron sputtering, ion sputtering, chemical vapor deposition, plasma enhanced chemical vapor deposition, cathodic arc deposition, and pulsed laser deposition.

Amorphous carbon may be made according to the present invention using a simple hydrocarbon gas, such as methane or acetylene gas, as the carbonaceous precursor. The hydrocarbon gas may comprise other substituents in minor amounts, such as nitrogen, oxygen, and fluorine. Preferably the hydrocarbon gas consists essentially of carbon and hydrogen. A preferred amorphous carbon coating comprises a hardness (nanohardness) of about 15 GPa measured using a nano-indentation hardness tester, a hydrogen concentration of about 32%, and/or a combination thereof.

Diffusion pump fluids also commonly are used as precursor materials for the formation of amorphous carbon. Diffusion pump fluids have a low vapor pressure and can be vaporized stably at room temperature. Examples of diffusion pump fluids which may be modified for use as precursor materials in the present invention include, but are not necessarily limited to: polyphenyl ether; elcosyl naphthalene; i-diamyl phthalate; i-diamyl sebacate; chlorinated hydrocarbons; n-dibutyl phthalate; n-dibutyl sebacate; 2-ethyl hexyl sebacate; 2-ethyl hexyl phthalate; di-2-ethylhexyl sebacate; tri-m-cresyl phosphate; tri-p-cresyl phosphate;o-dibenzyl sebacate. Other suitable precursor materials are the vacuum-distilled hydrocarbon mineral oils manufactured by Shell Oil Company under the trademark APIEZON®, and siloxanes, such as polydimethyl siloxane, pentaphenyl-trimethyl siloxane, and other silicon containing diffusion pump fluids, preferably pentaphenyl-trimethyl siloxane. Preferred diffusion pump fluids include but are not limited to, polyphenyl ether and elcosyl naphthalene. Other suitable carbonaceous precursors contain carbon and other constituent elements, such as oxygen, nitrogen, or fluorine.

A wide variety of gaseous precursors may be used to form metallic or ceramic coatings, as well. Suitable metallic precursors include, but are not necessarily limited to metal carbonyls, metal acetates, and metal alkanedionates, preferably metal pentanedionates. Specific examples include, but are not necessarily limited to tetrakis(dimethylamino)titanium, chromium carbonyls (hexacarbonylchromium), vanadium carbonyls (hexacarbonylvanadium carbonyl), such as erbium III acetate, yttrium 2,4-pentanedionate, erbium 2,4-pantanedionate, and N,N-(dimethylethanamine)-trihydridoaluminum. Preferred gaseous ceramic precursors are silane, trimethyl silane, acetylene, and methane.

The invention will be better understood with reference to the following example, which is illustrative only:

EXAMPLE 1

A 304 stainless steel tube having a length of 10.2 cm and a diameter 1.7 cm (an aspect ratio of 6) was placed in a vacuum chamber. The pressure in the vacuum chamber was pumped to $1.5\times10^{-5}$ torr. A flow of 5 standard cubic centimeters per minute (SCCM) of argon was introduced to a pressure of 15 millitorr. A pulse frequency of 3 kHz with a pulse width of 20 microseconds was applied to bias the steel tube at 4 kV for about 30 minutes. The argon gas was turned off, and silane gas ($SiH_4$) was introduced to form a metal silicide/silicon bonding region. The silane gas was introduced at 57 SCCM to obtain a pressure of 13 millitorr. A pulse frequency of 2 kHz at a pulse width of 20 microseconds was applied to bias the tube at 4 kV for about 30 minutes. Then, the silane gas was turned off, and a flow of acetylene $C_2H_2$ was introduced at about 40 SCCM, to obtain a pressure of 12 millitorr. A pulse frequency of 2 kHz at a pulse width of 20 microseconds was applied to bias the tube at 4 kV for about 3 hours. The result was a well-bonded, substantially uniform +/−5-6 micrometer coating of amorphous carbon covering the interior surface of the tube.

EXAMPLE 2

A 304 stainless steel tube having a length of 4 cm and a diameter 2 cm (an aspect ratio of 2) was placed in a vacuum chamber. The pressure in the vacuum chamber was pumped to $1.5\times10^{-5}$ torr. A flow of 5 standard cubic centimeters per minute (SCCM) of argon was introduced to a pressure of 15 millitorr. A pulse frequency of 3 kHz with a pulse width of 20 microseconds was applied to bias the steel tube at 7 kV for about 30 minutes. The argon gas was turned off, and silane gas ($SiH_4$) was introduced to form a metal silicide/silicon bonding region. The silane gas was introduced at 57 SCCM to obtain a pressure of 13 millitorr. A pulse frequency of 2 kHz at a pulse width of 20 microseconds was applied to bias the tube at 7 kV for about 30 minutes. Then, the silane gas was turned off, and a flow of acetylene $C_2H_2$ was introduced at about 40 SCCM, to obtain a pressure of 12 millitorr. A pulse frequency of 2 kHz at a pulse width of 20 microseconds was applied to bias the tube at 7 kV for about 2 hours. The result was a well-bonded, substantially uniform +/−2 micrometer coating of amorphous carbon covering the interior surface of the tube.

EXAMPLE 3

A 304 stainless steel tube having a length of 15 cm and a diameter 1.25 cm (an aspect ratio of 2) was placed in a vacuum chamber. The pressure in the vacuum chamber was pumped to $1.5\times10^{-5}$ torr. A flow of 5 standard cubic centimeters per minute (SCCM) of argon was introduced to a pressure of 15 millitorr. A pulse frequency of 3 kHz with a pulse width of 20 microseconds was applied to bias the steel tube at 7 kV for about 30 minutes. The argon gas was turned off, and silane gas ($SiH_4$) was introduced to form a metal silicide/silicon bonding region. The silane gas was introduced at 57 SCCM to obtain a pressure of 13 millitorr. A pulse frequency of 2 kHz at a pulse width of 20 microseconds was applied to bias the tube at 0.7 kV for about 30 minutes. Then, the silane gas was turned off, and a flow of acetylene $C_2H_2$ was introduced at about 40 SCCM, to obtain a pressure of 12 millitorr. A pulse frequency of 2 kHz at a pulse width of 20 microseconds was applied to bias the tube at 7 kV for about 2 hours. The result was a well-bonded, substantially uniform +/−2 micrometer coating of amorphous carbon covering the interior surface of the tube.

EXAMPLE 4

A 304 stainless steel tube having a length of 30 cm and a diameter 7.5 cm (an aspect ratio of 4) was placed in a vacuum chamber. The pressure in the vacuum chamber was pumped to $1.5\times10^{-5}$ torr. A flow of 5 standard cubic centimeters per minute (SCCM) of argon was introduced to a pressure of 15 millitorr. A pulse frequency of 3 kHz with a pulse width of 20 microseconds was applied to bias the steel tube at 7 kV for about 30 minutes. The argon gas was turned off, and silane gas ($SiH_4$) was introduced to form a metal silicide/silicon bonding region. The silane gas was introduced at 57 SCCM to obtain a pressure of 13 millitorr. A pulse frequency of 2 kHz at a pulse width of 20 microseconds was applied to bias the tube at 7 kV for about 30 minutes. Then, the silane gas was turned off, and a flow of acetylene $C_2H_2$ was introduced at about 40 SCCM, to obtain a pressure of 12 millitorr. A pulse frequency of 2 kHz at a pulse width of 20 microseconds was applied to bias the tube at 7 kV for about 2 hours. The result was a well-bonded, substantially uniform +/−2 micrometer coating of amorphous carbon covering the interior surface of the tube.

EXAMPLE 5

A 304 stainless steel tube having a length of 60 cm and a diameter 2 cm (an aspect ratio of 30) was placed in a vacuum chamber. The pressure in the vacuum chamber was pumped to $1.5\times10^{-5}$ torr. A flow of 5 standard cubic centimeters per minute (SCCM) of argon was introduced to a pressure of 15 millitorr. A pulse frequency of 3 kHz with a pulse width of 20 microseconds was applied to bias the steel tube at 7 kV for about 30 minutes. The argon gas was turned off, and silane gas ($SiH_4$) was introduced to form a metal silicide/silicon bonding region. The silane gas was introduced at 57 SCCM to obtain a pressure of 13 millitorr. A pulse frequency of 2 kHz at a pulse width of 20 microseconds was applied to bias the tube at 7 kV for about 30 minutes. Then, the silane gas was turned off, and a flow of acetylene $C_2H_2$ was introduced at about 40 SCCM, to obtain a pressure of 12 millitorr. A pulse frequency of 2 kHz at a pulse width of 20 microseconds was applied to bias the tube at 7 kV for about 2 hours. The result was a well-bonded, substantially uniform +/−2 micrometer coating of amorphous carbon covering the interior surface of the tube.

EXAMPLE 6

A 304 stainless steel tube having a length of 71 cm and a diameter 2 cm (an aspect ratio of 30) was placed in a vacuum chamber. The pressure in the vacuum chamber was pumped to $1.5\times10^{-5}$ torr. A flow of 5 standard cubic centimeters per minute (SCCM) of argon was introduced to a pressure of 15 millitorr. A pulse frequency of 3 kHz with a pulse width of 20 microseconds was applied to bias the steel tube at 7 kV for about 30 minutes. The argon gas was turned off, and silane gas ($SiH_4$) was introduced to form a metal silicide/silicon bonding region. The silane gas was introduced at 57 SCCM to obtain a pressure of 13 millitorr. A pulse frequency of 2 kHz at a pulse width of 20 microseconds was applied to bias the tube at 7 kV for about 30 minutes. Then, the silane gas was turned off, and a flow of acetylene $C_2H_2$ was introduced at about 40 SCCM, to obtain a pressure of 12 millitorr. A pulse frequency of 2 kHz at a pulse width of 20 microseconds was applied to bias the tube at 7 kV for about 2 hours. The result was a well-bonded, substantially uniform +/−2.2 micrometer coating of amorphous carbon covering the interior surface of the tube.

The thickness distribution of the DLC coated long tube (71 cm) was measured as follows:

| Sample Location Along Tube (cm) | Thickness (um) |
|---|---|
| 5 | 5 |
| 20 | 6 |
| 35 | 6 |
| 50 | 6 |
| 65 | 15 |

The resultant properties of the DLC coated long tube include a nanohardness of 15 GPa measured using a nano-indentation hardness tester, and a hydrogen concentration of 32%.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

We claim:

1. A tubular structure comprising:

a hollowed tubular structure having an aspect ratio of about 3 or more and comprising a first interior surface;

the first interior surface comprising an interior coating formed thereon, said interior coating defining a second interior surface of the tubular structure, said interior coating comprising a gaseous deposition product comprising a substantially uniform amorphous carbon coating comprising a thickness of about 5 micrometers or more, wherein said amorphous carbon coating comprises a hydrogen concentration of about 32%.

2. The tubular structure of claim 1 wherein said amorphous carbon coating comprises a thickness of about 15 micrometers or more.

3. The tubular structure of claim 2 wherein said substantially uniform amorphous carbon coating comprises a coating thickness comprising a uniformity of about +/−20% or less along its length.

4. The tubular structure of claim 2 wherein said amorphous carbon coating comprises a nanohardness of about 15 GPa measured using a nano-indentation hardness tester.

5. The tubular structure of claim 1 wherein said substantially uniform amorphous carbon coating comprises a coating thickness comprising a uniformity of about +/−20% or less along its length.

6. The tubular structure of claim 5 wherein said amorphous carbon coating comprises a nanohardness of about 15 GPa measured using a nano-indentation hardness tester.

7. The tubular structure of claim 1 wherein said amorphous carbon coating comprises a nanohardness of about 15 GPa measured using a nano-indentation hardness tester.

8. A tubular structure having an aspect ratio of about 6 or more and comprising an interior surface, said interior surface comprising a gaseous deposition product comprising a substantially uniform amorphous carbon coating having a thickness of about 2 micrometers or more, wherein said interior surface comprises one or more metal and a sequential gradient comprising:

silicon chemically bonded to said metal, forming a metal-silicide;

silicon cohesively bonded to said metal-silicide;

carbon chemically bonded to said silicon, forming silicon-carbide; and carbon cohesively bonded to said silicon-carbide forming said substantially uniform amorphous carbon coating.

9. The tubular structure of claim 8 wherein said coating has a thickness of about 5 micrometers or more.

10. The tubular structure of claim 9 wherein said substantially uniform amorphous carbon coating comprises a coating thickness comprising a uniformity of about +/−20% or less along its length.

11. The tubular structure of claim 8 wherein said coating has a thickness of about 15 micrometers or more.

12. The tubular structure of claim 11 wherein said substantially uniform amorphous carbon coating comprises a coating thickness comprising a uniformity of about +/−20% or less along its length.

13. The tubular structure of claim 8 wherein said coating comprises a nanohardness of about 15 GPa measured using a nano-indentation hardness tester.

14. The tubular structure of claim 13 wherein said coating thickness comprises a uniformity of about +/−20% or less along its length.

15. The tubular structure of claim 8 wherein said coating comprises a hydrogen concentration of about 32%.

16. The tubular structure of claim 8 wherein a gaseous precursor to said gaseous deposition product comprises a diffusion pump fluid selected from the group consisting of polyphenyl ether; elcosyl naphthalene; i-diamyl phthalate; i-diamyl sebacate; chlorinated hydrocarbons; n-dibutyl phthalate; n-dibutyl sebacate; 2-ethyl hexyl sebacate; 2-ethyl hexyl phthalate; di-2-ethyl-hexyl sebacate; tri-m-cresyl phosphate; tri-p-cresyl phosphate; and o-dibenzyl sebacate.

17. The tubular structure of claim 8 wherein said coating thickness comprises a uniformity of about +/−20% or less along its length.

18. The tubular structure of claim 17 wherein said coating comprises a nanohardness of about 15 GPa measured using a nano-indentation hardness tester.

19. A tubular structure having an aspect ratio of about 6 or more and comprising an interior surface, said interior surface comprising a gaseous deposition product comprising a substantially uniform amorphous carbon coating having a coating thickness of about 2 micrometers or more and comprising a uniformity of about +/−20% or less along its length, wherein said interior surface comprises one or more metal and a sequential gradient comprising:

silicon chemically bonded to said metal, forming a metal-silicide;

silicon cohesively bonded to said metal-silicide;

carbon chemically bonded to said silicon, forming silicon-carbide; and carbon cohesively bonded to said silicon-carbide forming said substantially uniform amorphous carbon coating.

20. The tubular structure of claim 19 wherein said coating comprises a nanohardness of about 15 GPa measured using a nano-indentation hardness tester.

21. The tubular structure of claim 20 wherein said coating thickness comprises a uniformity of about +/−20% or less along its length.

22. A tubular structure having an aspect ratio of about 6 or more and comprising an interior surface, said interior surface comprising a gaseous deposition product comprising a substantially uniform amorphous carbon coating having a thickness of about 0.5 micrometers or more and comprising a nanohardness of about 15 GPa measured using a nano-indentation hardness tester, wherein said interior surface comprises one or more metal and a sequential gradient comprising:

silicon chemically bonded to said metal, forming a metal-silicide;

silicon cohesively bonded to said metal-silicide;

carbon chemically bonded to said silicon, forming silicon-carbide; and carbon cohesively bonded to said silicon-carbide forming said substantially uniform amorphous carbon coating.

23. The tubular structure of claim 22 wherein said coating comprises a hydrogen concentration of about 32%.

24. The tubular structure of claim 22 wherein said coating thickness comprises a uniformity of about +/−20% or less along its length.

25. A tubular structure having an aspect ratio of about 6 or more and comprising an interior surface, said interior surface comprising a gaseous deposition product comprising a substantially uniform amorphous carbon coating having a thickness of about 2 micrometers or more, wherein said interior surface composes one or more metal and a sequential gradient comprising:

germanium chemically bonded to said metal, forming a metal-germanide;

germanium cohesively bonded to said metal-germanide;

carbon chemically bonded to said germanium, forming germanium-carbide; and carbon cohesively bonded to said germanium-carbide forming said substantially uniform amorphous carbon coating.

26. The tubular structure of claim 25 wherein said amorphous carbon coating has a thickness of about 5 micrometers or more.

27. The tubular structure of claim 25 wherein said amorphous carbon coating has a thickness of about 15 micrometers or more.

* * * * *